United States Patent
Ho et al.

(10) Patent No.: US 10,935,281 B1
(45) Date of Patent: Mar. 2, 2021

(54) SOLAR THERMAL RECEIVERS WITH MULTI-SCALE LIGHT TRAPPING GEOMETRY AND FEATURES

(71) Applicants: National Technology & Engineering Solutions of Sandia, LLC, Albuquerque, NM (US); The Australian National University, Acton (AU)

(72) Inventors: Clifford K. Ho, Albuquerque, NM (US); Joshua Mark Christian, Albuquerque, NM (US); John Downing Pye, Acton (AU); Jesus Daniel Ortega, Albuquerque, NM (US)

(73) Assignees: National Technology & Engineering Solutions of Sandia, LLC, Albuquerque, NM (US); The Australian National University, Acton (AU)

( * ) Notice: Subject to any disclaimer, the term of this patent is extended or adjusted under 35 U.S.C. 154(b) by 815 days.

(21) Appl. No.: 14/743,319

(22) Filed: Jun. 18, 2015

Related U.S. Application Data

(63) Continuation-in-part of application No. 14/535,100, filed on Nov. 6, 2014, now Pat. No. 10,295,224.

(60) Provisional application No. 62/015,052, filed on Jun. 20, 2014, provisional application No. 61/901,628, filed on Nov. 8, 2013.

(51) Int. Cl.
*F24S 10/70* (2018.01)
*F24S 30/422* (2018.01)

(52) U.S. Cl.
CPC ............ *F24S 10/72* (2018.05); *F24S 30/422* (2018.05); *F24S 2010/71* (2018.05)

(58) Field of Classification Search
CPC ...... F24J 2/242; F24J 2/5406; F24J 2002/241; F24S 30/422; F24S 2023/88; F24S 70/62; F24S 23/79
USPC ......................................................... 126/658
See application file for complete search history.

(56) References Cited

U.S. PATENT DOCUMENTS

| | | | | |
|---|---|---|---|---|
| 4,061,129 A | * | 12/1977 | Wilson | F24S 70/65 126/619 |
| 4,248,211 A | * | 2/1981 | Womack | F24S 23/71 126/658 |
| 4,271,820 A | * | 6/1981 | Holley | F24S 10/75 126/684 |
| 4,281,641 A | * | 8/1981 | Devore | F24S 20/20 126/605 |
| 4,394,859 A | * | 7/1983 | Drost | F24S 20/20 126/647 |
| 6,061,181 A | * | 5/2000 | Fereidooni | G02B 5/045 359/625 |
| 8,490,618 B2 | * | 7/2013 | Kroizer | F24J 2/0494 126/571 |
| 9,945,585 B2 | * | 4/2018 | Wagner | F24J 2/242 |

(Continued)

*Primary Examiner* — Avinash A Savani
*Assistant Examiner* — Deepak A Deean
(74) *Attorney, Agent, or Firm* — Daniel J. Jenkins

(57) ABSTRACT

Solar receivers including a plurality of multi-scale solar absorbing surfaces arranged such that light or heat reflected from or emitted from one or more of the plurality of solar absorbing surfaces impinges one or more other solar absorbing surfaces of the solar receiver. The disclosed receivers increase the amount of absorbed energy from a concentrated light source, such as a heliostat field, and reduce radiative and convective heat losses.

8 Claims, 13 Drawing Sheets

(56) References Cited

U.S. PATENT DOCUMENTS

| | | | | |
|---|---|---|---|---|
| 2009/0293933 A1* | 12/2009 | Clark | .................... | F24S 30/422 |
| | | | | 136/245 |
| 2010/0183443 A1* | 7/2010 | Thorne | .................. | F03D 9/007 |
| | | | | 416/146 R |
| 2011/0181018 A1* | 7/2011 | Bruneau | .................... | B60P 3/10 |
| | | | | 280/414.1 |
| 2012/0181973 A1* | 7/2012 | Lyden | .................... | B60L 11/182 |
| | | | | 320/101 |
| 2013/0192586 A1* | 8/2013 | Wasyluk | ................. | F22B 1/006 |
| | | | | 126/619 |
| 2013/0327316 A1* | 12/2013 | Bourgeois | ............... | E04H 4/129 |
| | | | | 126/561 |
| 2014/0021723 A1* | 1/2014 | Christy | .................. | F03D 9/007 |
| | | | | 290/55 |
| 2015/0059825 A1* | 3/2015 | Swatek | ................ | F24S 30/422 |
| | | | | 136/245 |
| 2015/0162869 A1* | 6/2015 | Lyden | .................. | H01L 31/042 |
| | | | | 320/101 |
| 2015/0330668 A1* | 11/2015 | Wagner | .................... | F24J 2/242 |
| | | | | 126/663 |

\* cited by examiner

Macro (~0.1-10m)

Meso (~0.1-100mm)

US 10,935,281 B1

SOLAR THERMAL RECEIVERS WITH MULTI-SCALE LIGHT TRAPPING GEOMETRY AND FEATURES

CROSS-REFERENCE TO RELATED APPLICATIONS

This application claims priority to U.S. Provisional Patent Application 62/015,052, filed Jun. 20, 2014, entitled "Fractal Materials and Designs with Optimized Radiative Properties," and is a Continuation-in-Part of U.S. patent application Ser. No. 14/535,100, filed Nov. 6, 2014, titled "BLADED SOLAR THERMAL RECEIVERS FOR CONCENTRATING SOLAR POWER," which claims priority to U.S. Provisional Patent Application No. 61/901,628, filed Nov. 8, 2013, titled "SOLAR THERMAL ADVANCED RECEIVER FOR CONCENTRATING SOLAR POWER TOWERS," all of which are incorporated herein by reference in their entireties.

STATEMENT CONCERNING FEDERALLY SPONSORED RESEARCH

This invention was developed under Contract DE-AC04-94AL85000 between Sandia Corporation and the United States Department of Energy. The U.S. Government has certain rights in this invention.

FIELD OF THE INVENTION

The present invention relates to solar thermal receivers, and more particularly to solar thermal receivers having multi-scale structures and geometries that increase effective solar absorptance and efficiency.

BACKGROUND OF THE INVENTION

Mounting concerns over the effect of greenhouse gases on global climate have stimulated research focused on limiting greenhouse gas emissions. Solar power generation is particularly appealing because substantially no greenhouse gases are produced at the power generation source.

Concentrated solar power (CSP) generation using solar receivers is known in the art. Briefly, concentrated solar power systems use lenses, mirrors, or other elements to focus sunlight incident on a relatively large area onto a small area called a solar receiver. The concentrated sunlight can be used to heat a fluid within the solar receiver. The fluid heated within the solar receiver can be used to create energy, such as by driving a turbine to generate power or by providing a secondary heat source.

Conventional receivers for concentrating solar power consist of panels of tubes that are arranged in a cylindrical or cubical shape to face the incoming solar irradiance. However, these configurations also maximize radiative and convective heat losses to the environment; most of the sunlight reflected off of these surfaces is lost to the environment. For example, at high temperatures (receivers can reach 600° C. and higher), the radiative heat loss (~T4) is significant. Previous receivers have attempted to minimize these losses by increasing solar absorptivity and reducing thermal emissivity of coatings at the micro scale; however, very little research has investigated the optimization of features and radiative processes of receivers and other components at the meso and macro scales (millimeters to meters).

The need therefore remains for an efficient solar receivers that yield high solar absorptance and thermal efficiency and that enable higher efficiency power cycles. In addition, a need exists to alleviate the need for expensive coatings that degrade and need to be reapplied.

SUMMARY OF THE DISCLOSURE

Figure 1:
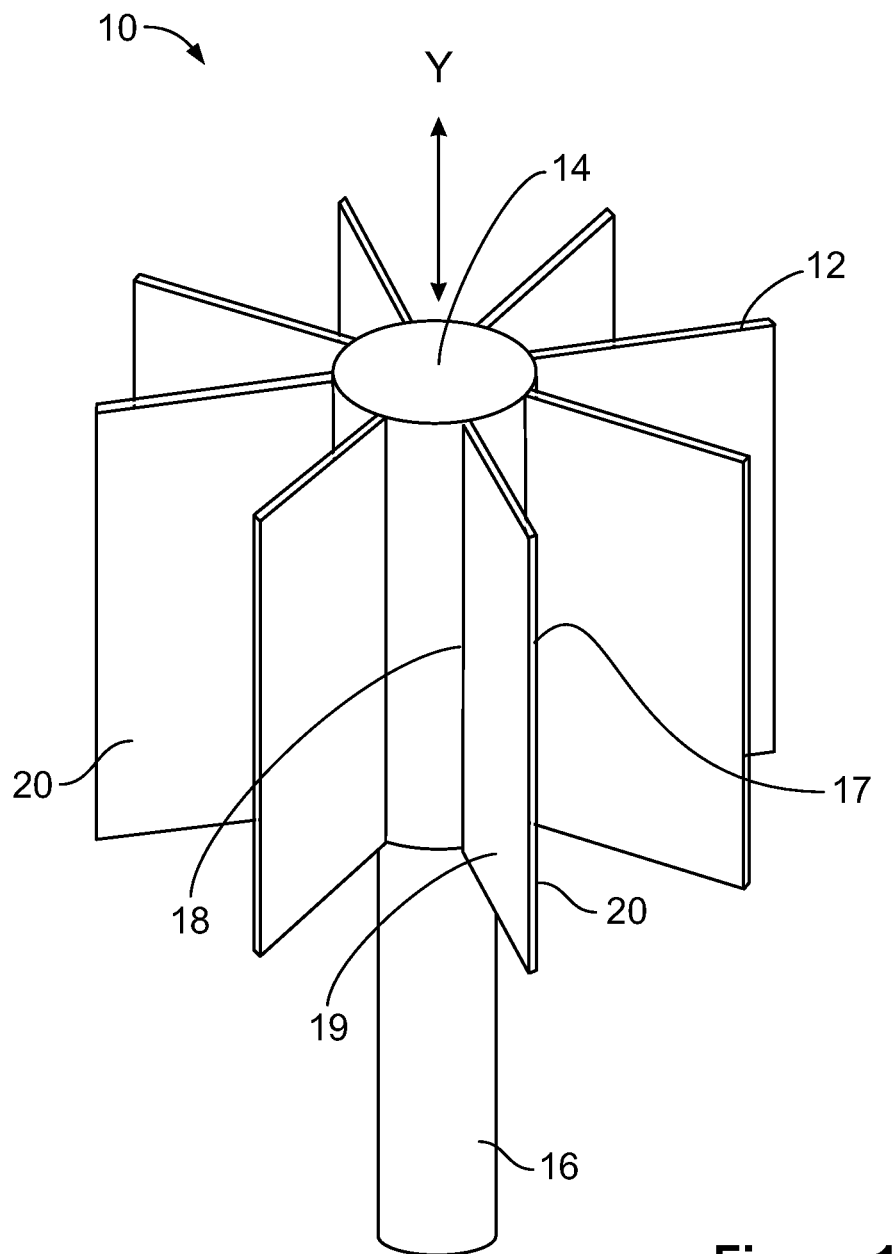
FIG. 1 is an illustration of a solar receiver according to an exemplary embodiment of the disclosure.

The present disclosure is directed to solar receivers that include a plurality of solar absorbing surfaces arranged such that light or heat reflected from or emitted from, respectively, one or more of the plurality of solar absorbing surfaces impinges one or more other solar absorbing surfaces of the solar receiver. The disclosed receivers reduce the local radiative view factors and heat losses and increase the amount of absorbed energy from a concentrated light source, such as a heliostat field.

In an embodiment of the disclosure, a solar receiver is disclosed that includes a plurality of solar panels capable of absorbing solar energy disposed radially about a central hub having a vertical axis. One or more of the plurality of solar panels is arranged to reflect and/or radiate solar energy to one or more other solar panels to trap the reflected and/or radiated solar energy.

In an embodiment of the disclosure, a solar receiver is disclosed that includes a support panel is disclosed that includes a plurality of solar panels attached to and extending from the support panel. One or more of the plurality of solar panels is arranged to reflect and/or radiate solar energy to one or more other solar panel to trap the reflected and/or radiated solar energy.

One advantage of the present disclosure is to provide a solar receiver that will significantly increase the absorbed solar radiation while reducing heat losses (radiative and convective), yielding higher thermal efficiencies, improved performance, and reduced costs for concentrating solar power tower systems.

Another advantage of the present disclosure is to provide a solar receiver that will significantly increase thermal efficiencies of solar energy receivers and a broad range of thermal collection devices for sustainable, lower-cost, high-efficiency energy conversion.

Another advantage of the present disclosure is that the receiver footprint (optical intercept area) can be smaller with the same exposed surface area and surface irradiance, which will reduce heat losses. Large structural cavities, which are used to reduce radiative heat losses, can also be avoided.

Another advantage of the present disclosure is that the designs can reduce thermal emittance by reducing local view factors in hottest regions.

Other features and advantages of the present disclosure will be apparent from the following more detailed description of the preferred embodiment, taken in conjunction with the accompanying drawings which illustrate, by way of example, the principles of the disclosure.

DETAILED DESCRIPTION OF THE DISCLOSURE

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete and will fully convey the scope of the invention to those skilled in the art.

The present disclosure is directed to solar receivers, hereinafter referred to as "receivers," that reduce the amount of radiative energy loss while increasing absorbed radiation, yielding higher thermal efficiencies, improved performance, and reduced costs for concentrating solar power tower systems. The disclosed receivers include one or more solar absorbing structures or panels arranged such that light reflected from or radiate heat from one or more solar absorbing panels or surfaces impinges one or more other solar absorbing panels or surfaces of the solar receiver. In such a manner, the reflected and/or radiated energy that impinges and is absorbed is "trapped" by the other panels or surfaces. The arrangement of panels or surfaces having this functionality at multiple length scales may be referred to as a "fractal" arrangement or feature. The panels and/or surfaces may have a major plane arranged vertically or horizontally relative to the earth. In another embodiment, the panels or surfaces may have a major plane angle arranged between vertical and horizontal. The disclosed arrangement maximizes solar absorption while minimizing radiative heat loss by trapping solar irradiation at multiple scales. In addition, the disclosed fractal structures reduce local view factors and thermal emittance. One or more of the solar absorbing panels include one or more solar absorbing surfaces that reflect light and/or radiate heat to one or more of the solar absorbing panels. The solar absorbing surfaces may be flat, curved, wavy, pleated, irregular or combinations thereof.

In the present disclosure, the term "macro" refers to meter scale between 0.1 m and 10 m. Additionally, the term "meso" refers to millimeter to centimeter scale from 0.1 mm to up 100 mm. According to the present disclosure, the arrangement of solar panels, or macro scale arrangement, may trap up to 40% of reflected and emitted energy, and the arrangement of tubes, or meso scale arrangement, may trap up to 30% of reflected and emitted energy. In an embodiment, the arrangement of receiver panels, or macro scale arrangement, may trap up to 5% of reflected and emitted energy, and the arrangement of tubes, or meso scale arrangement, may trap up to 5% of reflected and emitted energy. The amount of reflected solar energy that can be recaptured by the multi-scale designs depends, in part, on the intrinsic solar absorptance of the material. The increase in effective solar absorptance is greater when the intrinsic solar absorptance is lower.

The disclosed receiver can operate at high temperatures (>650° C.) while reducing radiative and convective heat losses at high concentration ratios (~1000 suns or more) to achieve high annual thermal efficiencies. In an embodiment, the disclosed receiver may reduce radiative view factors by up to 70% and total heat loss by 50% with an increase in thermal efficiency of nearly 10%. This translates into significant cost savings by requiring fewer heliostats for the same amount of thermal output. Achieving these metrics is necessary to reduce the levelized cost of electricity of concentrating solar power towers to levels comparable with current fossil-fueled power plants.

The disclosed solar receivers have increased or improved efficiency compared to conventional receivers. In an embodiment, the disclosed receivers may be at least 85% efficient. In another embodiment, the solar receivers may be at least 90% efficient. In another embodiment, the solar receivers may be at least 95% efficient.

The disclosed receivers reduce view factors and thermal emittance at multiple scales (panels and surfaces). Incorporation of these fractal features and designs at multiple scales (microns to meters) significantly increase thermal efficiencies of solar energy receivers and a broad range of thermal collection devices for sustainable, lower-cost, high-efficiency energy conversion.

FIG. 1 illustrates an embodiment of the present disclosure. According to this embodiment, a receiver 10 is disclosed that includes a plurality of blades or receiver panels (panels) 12 radially disposed about and extending from a central hub 14. The panels 12 may be referred to as blades. In this exemplary embodiment, the panels 12 radiate perpendicular from the central axis Y of the hub 14. The hub 14 is connected to a tower 16 for elevating the receiver 10 above a surface (not shown), such as the ground. The panels 12 have a leading edge 17 that is distant from the hub 14, and a trailing edge 18 that is proximate to the hub 14. As such, the trailing edge is located where the local radiative view factors are lower than at the leading edge, or in other words, the trailing edge is toward the interior of the receiver. In this and in other drawings of the disclosure, the hub and other components are not necessarily to scale, and may be large enough to contain piping and other features within. Each segment of the radial structure can be modular, consisting of the outward radial panels and the portion of the hub that connects the radial panels. In this exemplary embodiment, the panels 12 have a generally rectangular geometry or shape, with the major plane of the shape perpendicular to the mounting surface or ground. In another embodiment, the panels 12 have a rectangular, square, wedge or other shape.

Additionally, the panels 12 have a first side 19 and a second side 20 opposite the first side 19. The first and second sides 19, 20 may be coated or treated with heat absorbing surfaces, coatings or textures to efficiently capture the incident concentrated solar radiation. As can be seen in FIG. 1, both first and second sides 19, 20 sides of the panels 12 can be illuminated.

The radially extending blade design increases the effective solar absorptance and efficiency by providing a light trap for the incident solar radiation while reducing heat losses from radiation and convection. Light impinging upon the panels 12 is all or partially reflected to an adjacent and/or other panel. Thermal radiation emitted from panels 12 is all or partially directed to adjacent or other panels. Convective heat loss from panels 12 is all or partially absorbed by adjacent and/or other panels. In an embodiment, the receiver 10 has been shown to reduce radiative view factors by up to 70% and total heat loss by 50% with an increase in thermal efficiency of nearly 10%.

In this exemplary embodiment, the receiver 10 includes eight panels 12, however, in another embodiment, the receiver 10 may include 2 or more panels 12. In another embodiment, the receiver 10 may include between 2 and 1000 panels. In another embodiment, the receiver 10 may include between 3 and 20 panels. In another embodiment, the receiver 10 may include between 4 and 10 panels. As can be seen in FIG. 1, both sides of the panels 12 can be illuminated.

The hub 14 provides a central attachment point for the panels 12. In addition, the hub 14 and/or tower 16 may include piping for fluidly connecting the panels 12 to a fluid source and fluid receiver (not shown) as would be appreciated by one of ordinary skill in the art. Further in addition, the hub 14 and/or tower 16 may include pumps, valves and/or other fluid transport and control devices for providing and/or controlling fluid to the panels 12.

In this exemplary embodiment, the panels 12 are attached to the hub 14. In another embodiment, the panels 12 may be pivotally attached to the hub 14 in a manner that allows the panels 12 to pivot about the Y axis. For example, one or more of the panels 12 may pivot so as to face a surface more perpendicular to solar irradiance.

Figure 2:
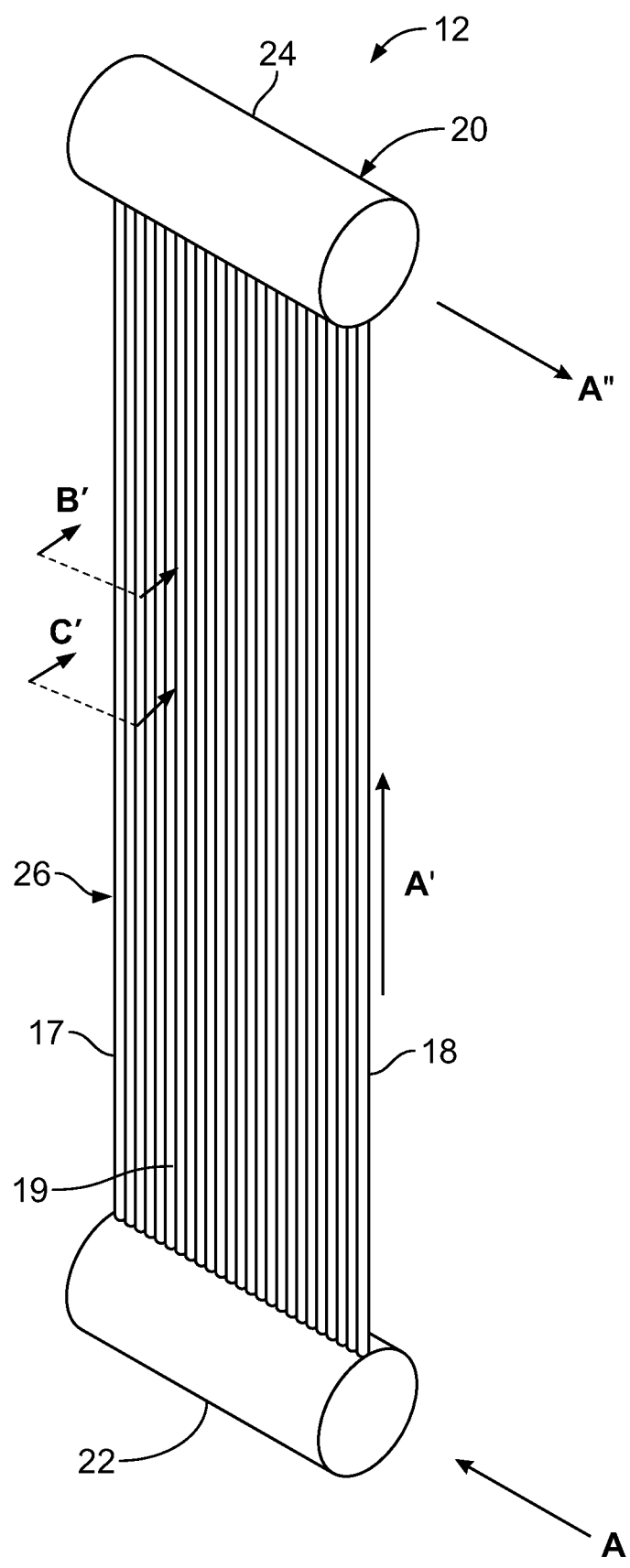
FIG. 2 is an illustration of a solar receiver panel according to an exemplary embodiment of the disclosure.

FIG. 2 illustrates an example of a receiver panel 12 according to an embodiment of the invention. As can be seen in FIG. 2, the receiver panel 12 includes a first manifold 22, a second manifold 24, and a plurality of conduits or tubes 26 disposed between the first and second manifolds 22, 24. In this exemplary embodiment, the first manifold 22 receives a fluid from the hub 14 or tower 16 in the direction shown by arrow A. The fluid is then distributed to the plurality of tubes 26 and flows in direction A' to the second manifold 24, where it is collected and flows to the hub 14 or tower 16 in direction A". In another embodiment, the direction of flow may be reversed. The first and second manifolds 22, 24 may include piping, baffling or other fluid control and distribution components to provide and control the flow of fluid to the tubes 26. In this exemplary embodiment, the tubes 26 have a generally circular cross section. In another embodiment, the tubes 26 may have other cross sections, such as, but not limited to square, rectangular, oval, diamond, hexagonal or other shape that fully or partially reflect light to an adjacent and/or other panel or tube and/or emit thermal radiation fully or partially to adjacent or other panels or tubes. Additionally, in this exemplary embodiment, the tubes 26 are in close proximity or touching adjacent tubes. In an embodiment, some minimal spacing may be present to allow for expansion. In an embodiment, panels 12 may include one or more tubes with or without a manifold.

Figure 3A:
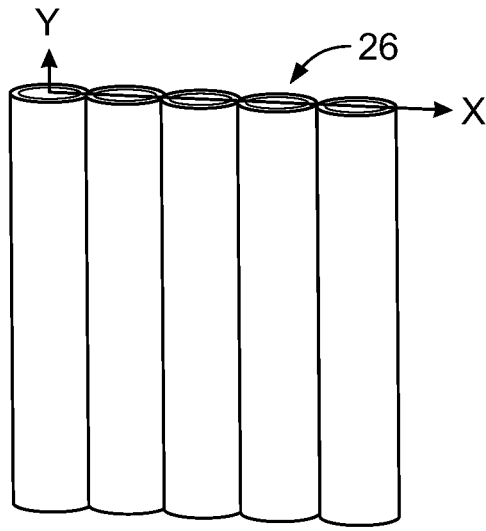
FIG. 3A is an illustration of a section of solar collection tubes taken from between lines B'-C' according to an embodiment of the disclosure.
Figure 3B:
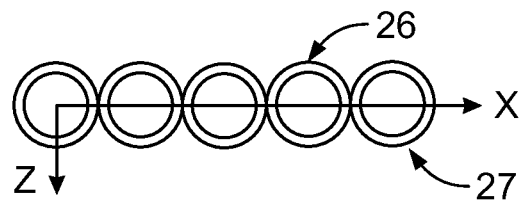
FIG. 3B is a top view of the section of tubes of FIG. 3A.

FIG. 3A illustrates section of tubes 26 taken between line B' and C' of FIG. 2. FIG. 3B is a top view of tubes 26 of FIG. 3. As can be seen in FIG. 3, the tubes 26 have a tube axis Y that extends along the central axis of the tube. As can be seen in FIG. 4, the tube axis are aligned along axis X, which will be referred to as the tubes having zero (0) degree offset. Also, the tube leading edges 27 in the Z direction are aligned or have a 0 degree offset along the X axis. The direction of incoming light is from the Z direction.

Figure 4A:
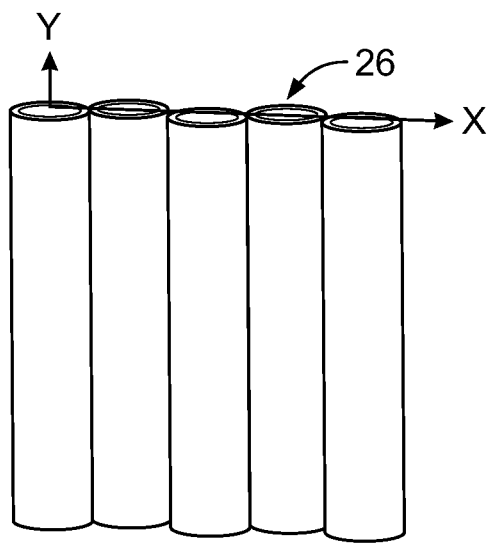
FIG. 4A is another section of tubes according to another embodiment of the disclosure.
Figure 4B:
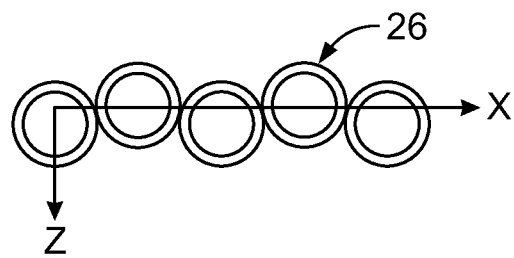
FIG. 4B is a top view of the section of tubes of FIG. 4A.
Figure 5A:
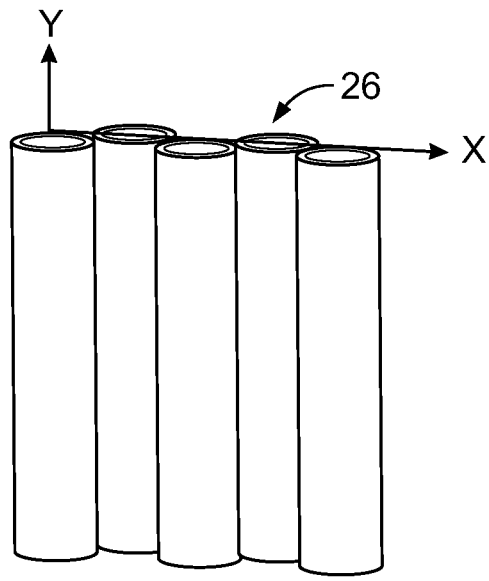
FIG. 5A is another section of tubes according to another embodiment of the disclosure.
Figure 5B:
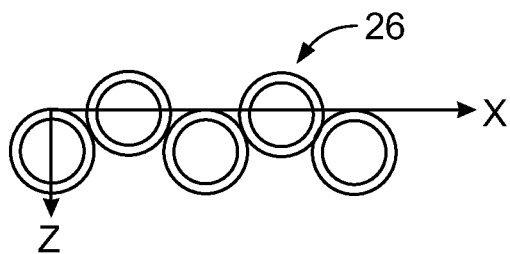
FIG. 5B is a top view of the section of tubes of FIG. 5A.
Figure 6A:
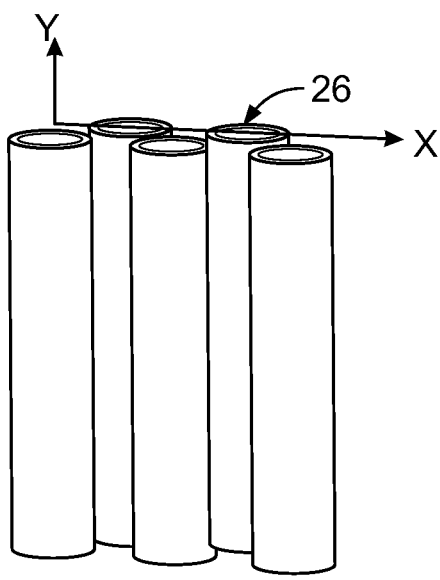
FIG. 6A is another section of tubes according to another embodiment of the disclosure.
Figure 6B:
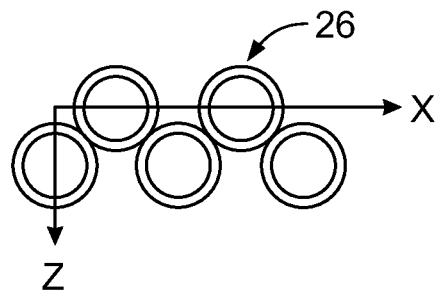
FIG. 6B is a top view of the section of tubes of FIG. 6A.
Figure 7:
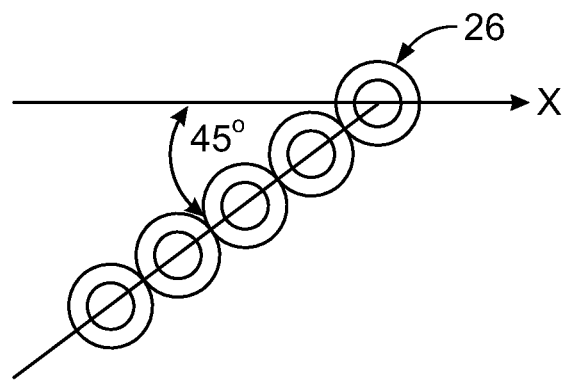
FIG. 7 illustrates an array of tubes rotated 45 degrees from the X axis.

FIGS. 4A and 4B illustrate tubes 26 having 15 degree offset, or in other words the angle between adjacent tube's tube axis along the X axis is 15 degrees. FIGS. 5A and 5B and 6B and 6B illustrate tubes having 30 degree and 45 degree offset, respectively. In another embodiment, the tubes may have a leading edge offset as a result of adjacent tubes of different cross-section size, shape, diameter and/or geometry. In another embodiment, tubes may be offset by between greater than 0 degrees and less than 45 degrees. In an embodiment, circular cross section tubes may be offset 30 degrees. FIG. 7 illustrates the array of tubes rotated 45 degrees from the X axis.

Figure 8A:
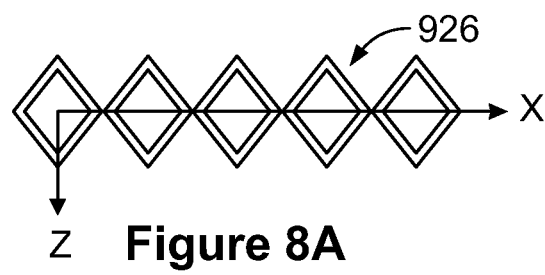
FIG. 8A illustrates an array of diamond cross section tubes offset 0 degrees according to an embodiment of the disclosure.
Figure 8B:
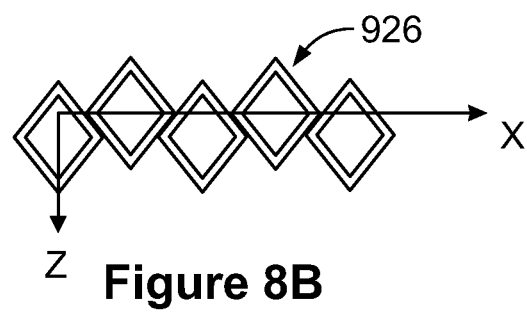
FIG. 8B illustrates an array of diamond cross section tubes offset 15 degrees according to an embodiment of the disclosure.

FIGS. 8A and 8B illustrate diamond cross sectional tubes 926 having 0 and 15 degree offset, respectively. The diamond cross sectional tubes 926 may be arranged according to any of the embodiments discussed above.

Figure 9:
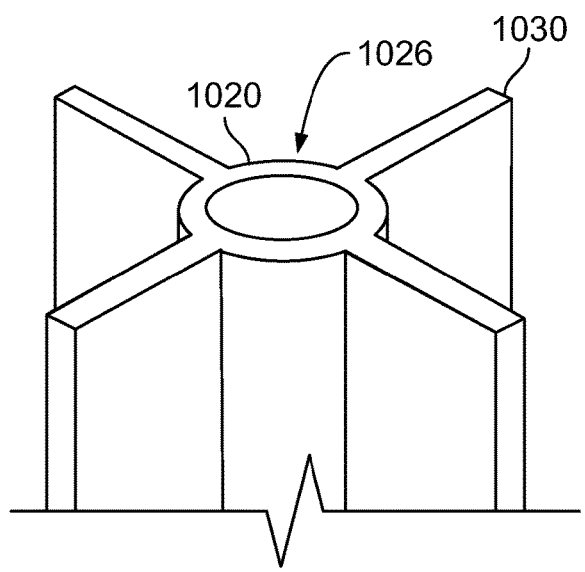
FIG. 9 illustrates another tube design according to an embodiment of the disclosure.

FIG. 9 illustrates a finned tube 1026 having a central tube component 1028 and fins 1030. In this exemplary embodiment, the finned tube 1026 has 4 fins 1030. In another embodiment, the finned tube 1026 may have two or more fins 1030. The finned tubes 1026 may be arranged according to any of the embodiments discussed above.

In an embodiment, a plurality of circular cross section or cylindrical tubes is offset between 0 and 45 degrees from an adjacent tube. For cylindrical tubes, the offset is to both the tube center axis and the leading edge. In an embodiment, a plurality of circular cross section or cylindrical tubes is offset 30 degrees from an adjacent tube. In another embodiment a plurality of diamond cross section tubes are offset by 0 degrees.

Figure 10:
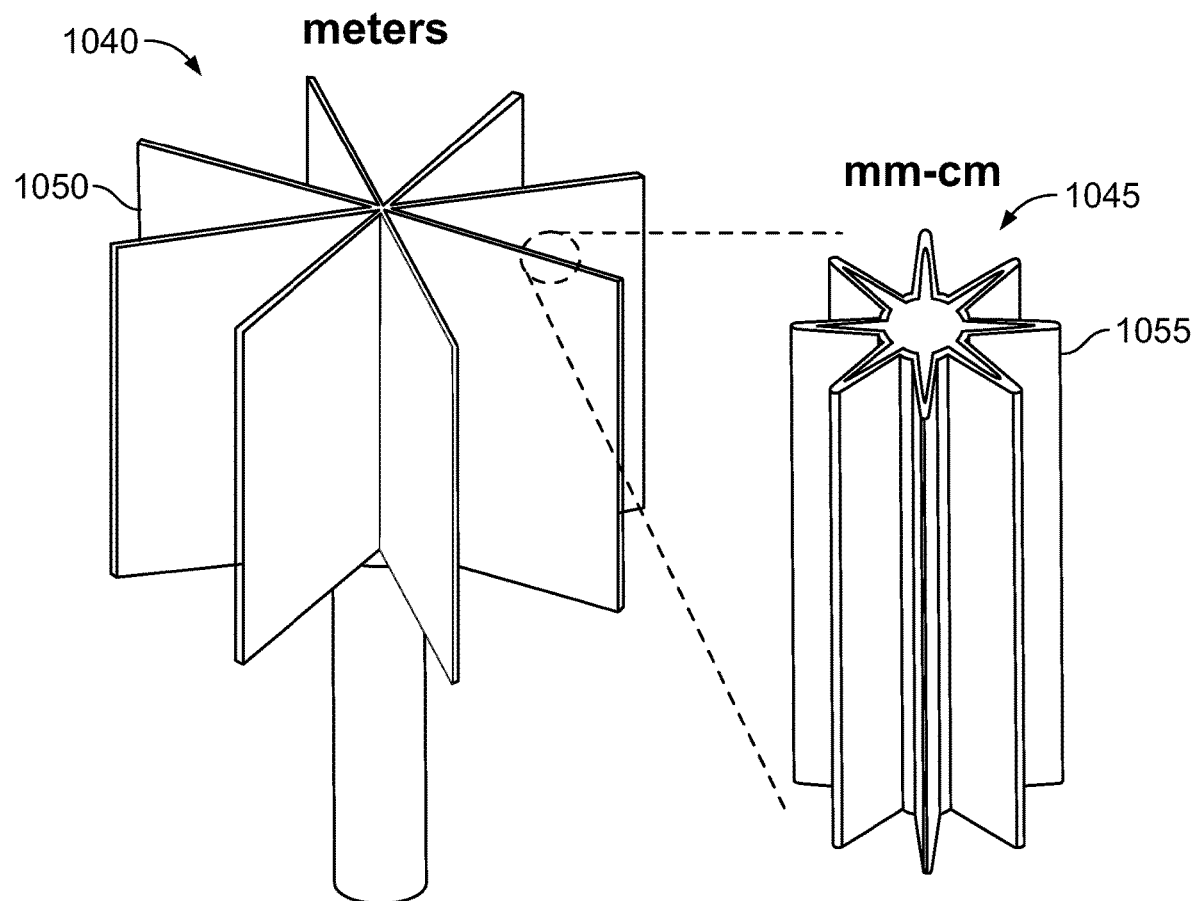
FIG. 10 is an illustration of another solar receiver panel according to another exemplary embodiment of the disclosure.

FIG. 10 illustrates an example of a multi-scale receiver 1040. The receiver 100 is at the macro scale (left), and the tubes 1045 shown to the right, which are at the meso scale, form the panels 1050 of the receiver 1040. The tubes carry heat transfer fluid and form the panels of tubes at the macro scale with similar light-trapping geometries. In this exemplary embodiment, the tubes 1045 include fins 1055 having passages 1060 for the heat transfer fluid.

Figure 11:
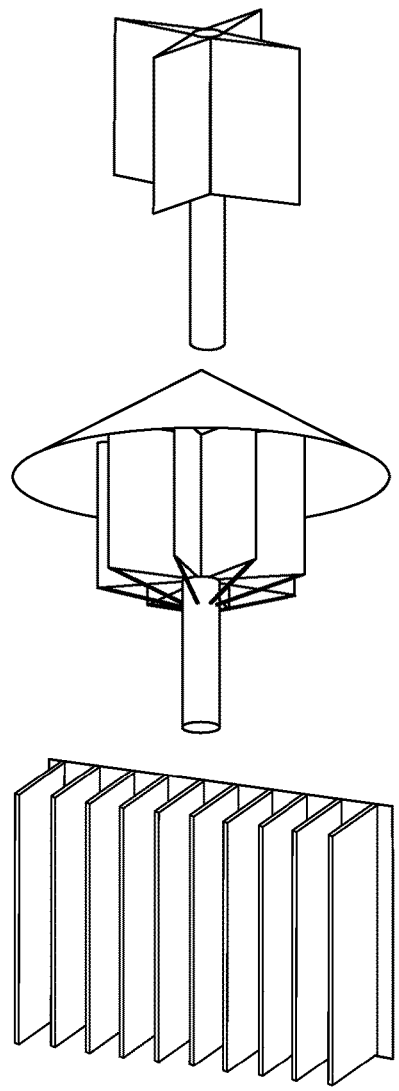
FIG. 11 is an illustration of examples of solar receivers and tube designs according to another exemplary embodiment of the disclosure.
Figure 11:
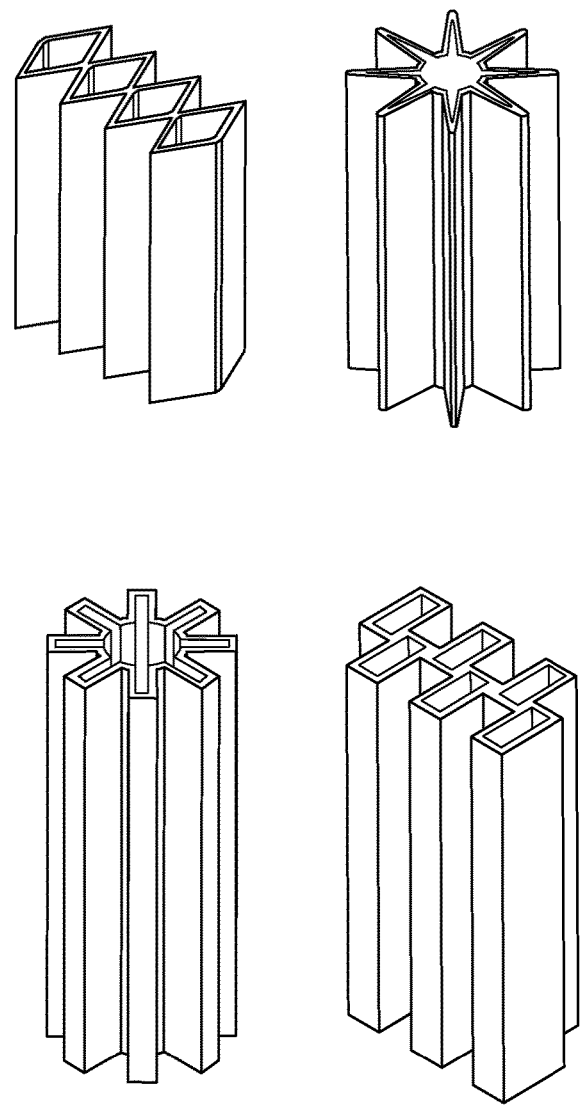

FIG. 11 illustrates examples of multi-scale receiver designs at the macro (left) and meso (right) scales. The meso-scale designs are tubes that carry the heat transfer fluid and form the panels of tubes at the macro scale with similar light-trapping geometries.

Figure 12:
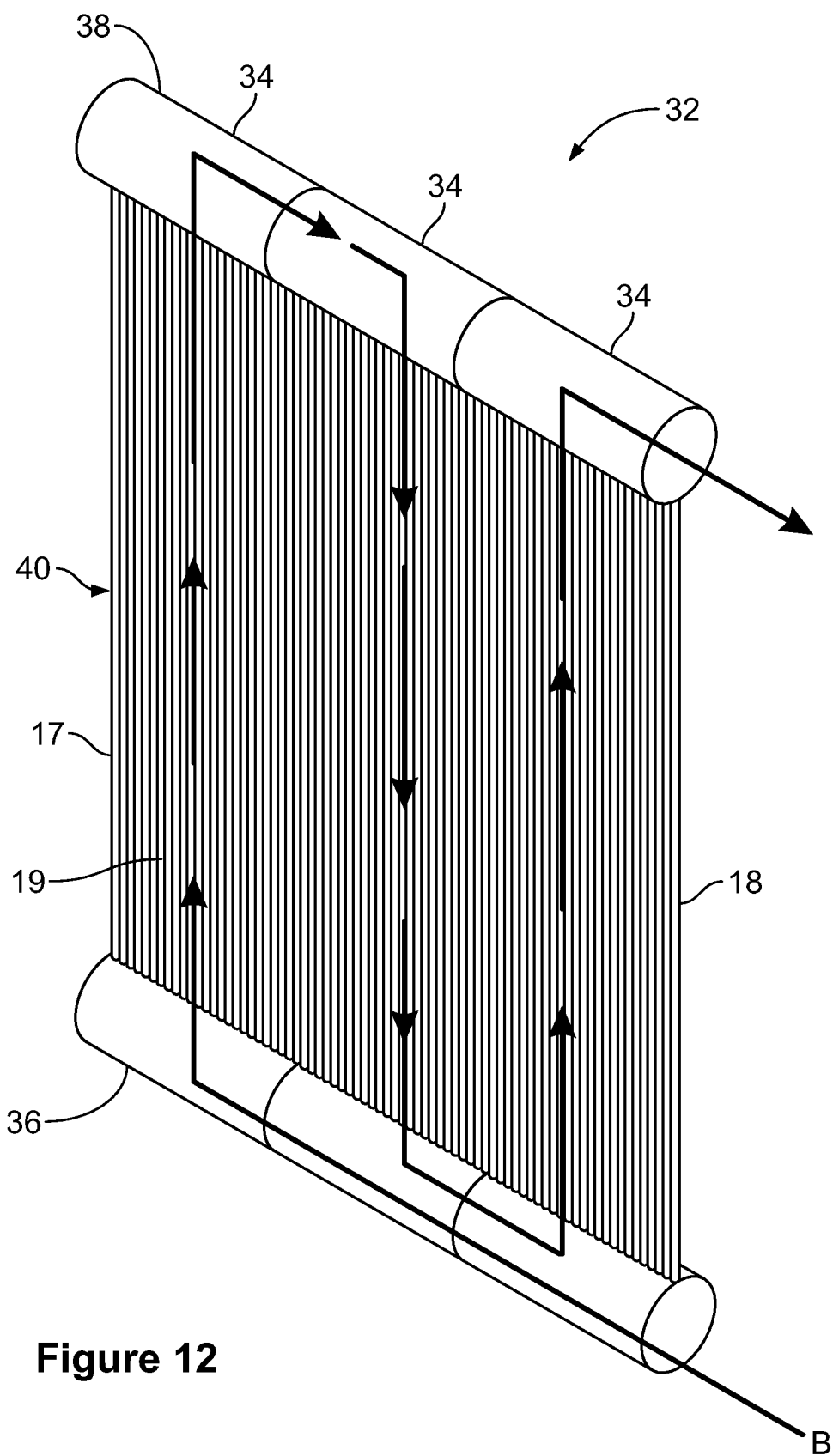
FIG. 12 is an illustration of another solar receiver panel according to another exemplary embodiment of the disclosure.

FIG. 12 illustrates another example of a panel 32 according to another embodiment of the disclosure. As can be seen in FIG. 12, the panel 32 includes receiver sub-panels 34. Panel 32 includes a leading edge 17, a trailing edge 18, a first side 19, and a second side 20 (opposite the first side 19, but not shown). In this exemplary embodiment, the panel 32 includes three sub-panels 34. In another embodiment, the panel 32 may include two or more sub-panels. Fluid flow is indicated by arrows B. In another embodiment, the direction of fluid flow may be reversed. In another embodiment, the fluid may enter the first bottom sub-panel and be redirected to the tubes (as would be the case if the panel were flipped so the bottom header was the top header. In another embodiment, the fluid direction of the flipped receiver panel may be reversed. In this exemplary embodiment, fluid is first provided to the tubes of the panel closest to the leading edge 17. In another embodiment, fluid may be first provided to the tubes of the panel closest to the trailing edge 18.

Each receiver sub-panel 34 includes a first manifold 36, a second manifold 38, and a plurality of tubes 40 receiving fluid flow the first manifold 36 and providing fluid to the second manifold 38. The first and second manifolds 36, 38 may include piping, baffling or other fluid control and distribution components to provide and control the flow of fluid to the tubes 40. In this exemplary embodiment, the tubes 40 have a generally circular cross section. In another embodiment, the tubes 40 may have other cross sections, such as, but not limited to square, rectangular, and oval.

By providing fluid to the leading edge first, the fluid reaches maximum temperature furthest away from the leading edge, in this example, closest to the central axis Y of the hub 14. In this case, the hottest surfaces of the receiver panels are located in the interior regions where the local view factors to the environment are lowest. This will reduce the radiative heat loss. In addition, heat loss by convection can be recuperated when the hot air moves from the hotter interior regions to the cooler exterior regions, essentially preheating the cooler surfaces.

Figure 13:
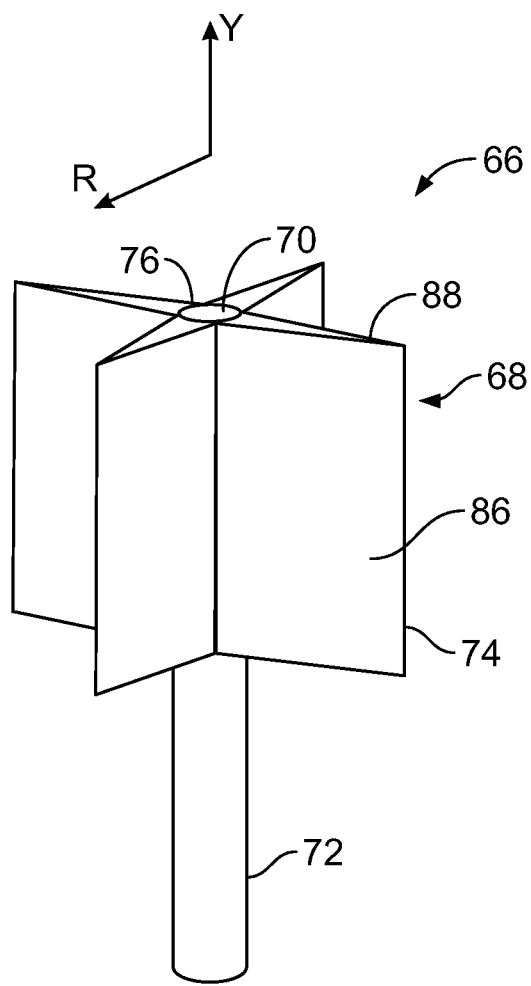
FIG. 13 is an illustration of another solar receiver according to another exemplary embodiment of the disclosure.
Figure 14:
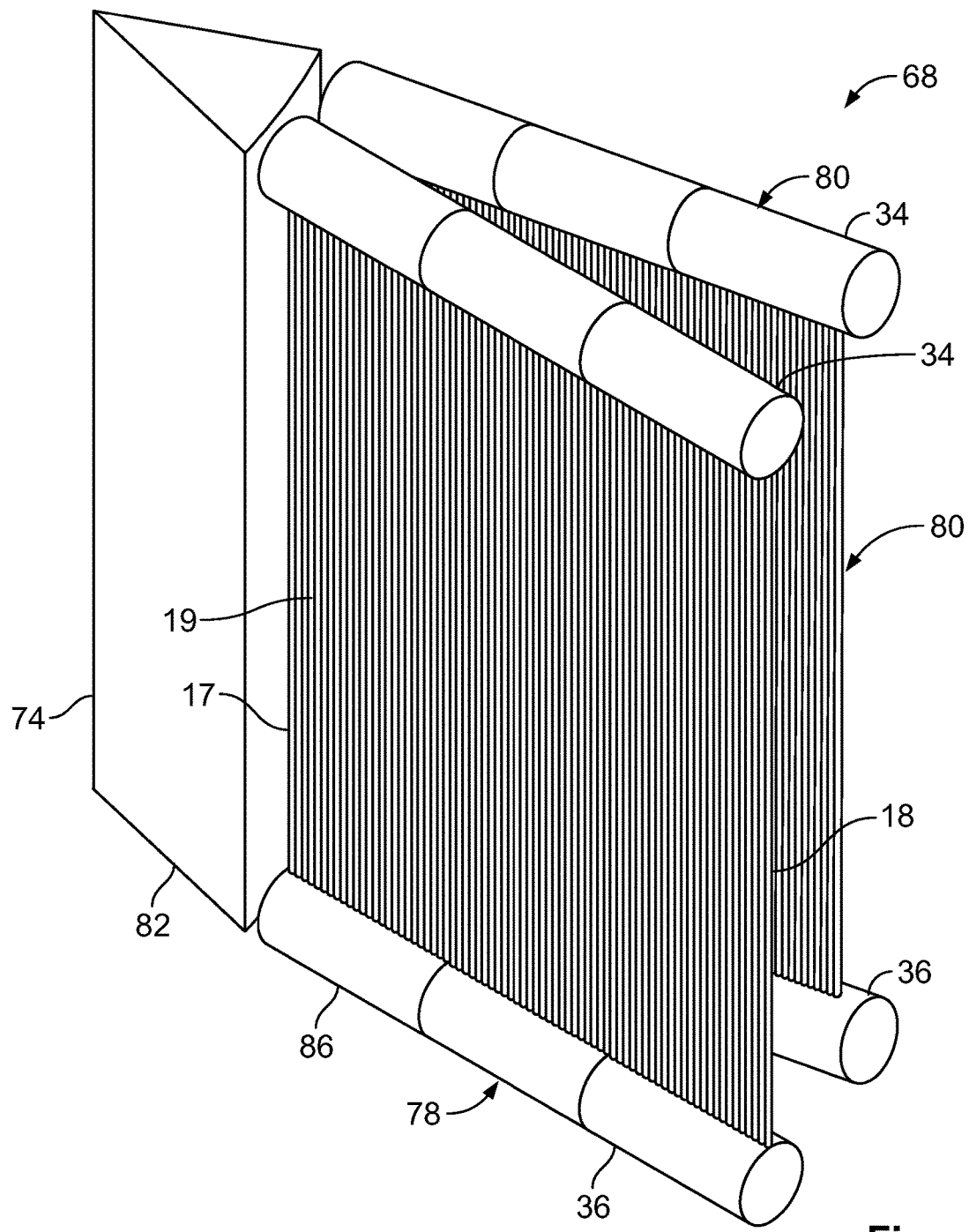
FIG. 14 is an illustration of another solar receiver panel system according to an exemplary embodiment of the disclosure.
Figure 15:
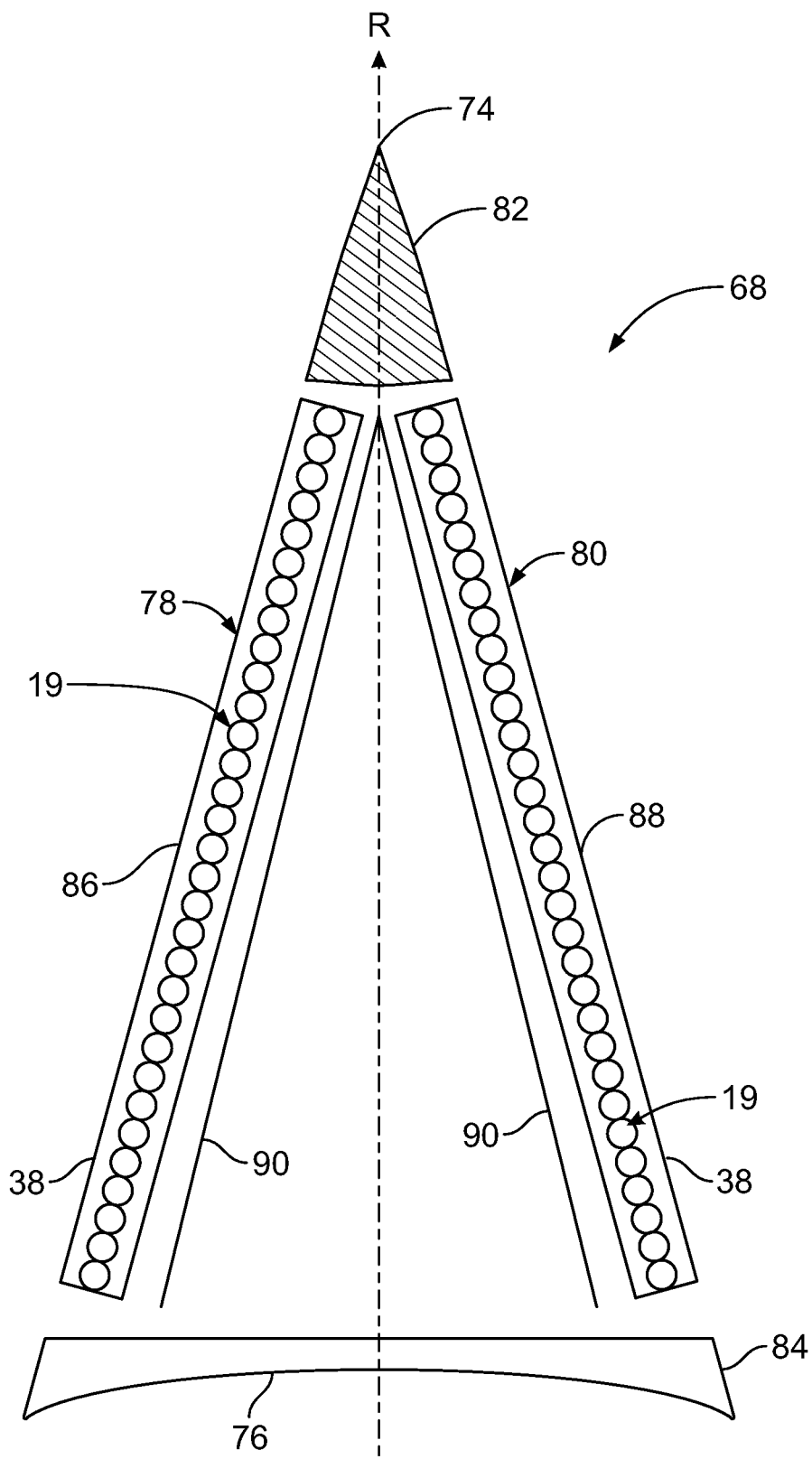
FIG. 15 is a partial cut away overhead view of one of the solar receiver panel system of the solar receiver shown in FIG. 14 having the top headers cut away to show the tubes.

FIGS. 13, 14 and 15 illustrate another exemplary embodiment of a receiver 66 according to an embodiment of the disclosure. As can be seen in FIG. 14, the receiver 66 includes a plurality of receiver panel systems 68 connected to and radially disposed about a central hub 70. The plurality of receiver panel systems 68 extend from the central hub 70 in a radial direction. In this exemplary embodiment, the radial axis of the receiver panel systems 68 radiate perpendicular from the central axis Y of the hub 70 in radial direction R. The hub 70 is connected to a tower 72 for elevating the receiver 66 above a surface (not shown). The receiver panel systems 68 have a leading edge 74 that is distant from the hub 70, and a trailing edge 76 that is proximate to the hub 70.

As can be seen in FIGS. 14 and 15, the receiver panel system 68 include a first receiver panel 78 and a second receiver panel 80 that generally come together to form a wedge or triangular shape that apexes in the radial direction. The receiver panel system 68 may include a nose panel, cap or other structural member 82 that provides structural support and aerodynamic streamlining to the receiver panel system 68. The receiver panel system 68 may further include a rear panel, cap or structural member 84 that provides structural support and connection to the hub 70. The receiver panel system 68 includes a first side 86 and a second side 88. In addition, the receiver panel system 68 may include insulation and/or reflective material or components 90 disposed behind the first and/or second receiver panels 78, 80 for providing thermal control and/or for reflecting irradiance back upon the sub-panels. The receiver panel system 68 may include additional structures and supports for joining and/or supporting the panel components.

In this exemplary embodiment, the receiver 66 includes four receiver panel systems 68, however, in another embodiment, the receiver 66 may include 2 or more receiver panel systems 68. In another embodiment, the receiver 66 may include between 2 and 1000 receiver panel systems. In another embodiment, the receiver 66 may include between 3 and 20 receiver panel systems. In another embodiment, the receiver 66 may include between 4 and 10 receiver panel systems. In an embodiment, receiver panels forming the receiver panel systems may include one or more tubes with or without a header. As can be seen in FIG. 5, both sides of the receiver 66 can be illuminated.

The hub 70 provides a central attachment point for the receiver panel systems 68. In addition, the hub 70 and/or tower 72 may include piping for fluidly connecting the receiver panel systems 68 to a fluid source and fluid receiver (not shown) as would be appreciated by one of ordinary skill in the art. Further in addition, the hub 70 and/or tower 72 may include pumps, valves and/or other fluid transport and control devices for providing and/or controlling fluid to the receiver panel systems 68.

In this exemplary embodiment, the receiver panel systems 68 are attached to the hub 70. In another embodiment, the receiver panel systems 68 may be pivotally attached to the hub 70 in a manner that allows the receiver panel systems 68 to be pivoted about the Y axis. For example, one or more of the 68 may be pivoted so as to face a surface more perpendicular to solar irradiance.

FIGS. 14 and 15 show a more detailed illustration of a receiver panel system 68 according to an embodiment of the invention. The rear cap 80 has been removed from FIG. 13 for clarity. As can be seen in FIGS. 14 and 15, the first and second receiver panels 78, 80 are similar in shape and structure, and will described by referencing the first receiver panel 78, while being understood that corresponding similar components are shown on the second receiver panel 80. The first receiver 78, which has a general panel structure, includes variations as discussed with the various embodiments, including, but not limited to being constructed of a single panel. In addition, this embodiment may include piping and/or other structures that may allow for fluid to be provided between the first and second receiver panels 78, 80. It should be noted that in this embodiment, illumination does not directly impact the interior side of the tubes of the sub-panels, although sunlight may be reflected to the interior side of the tubes.

Figure 16:
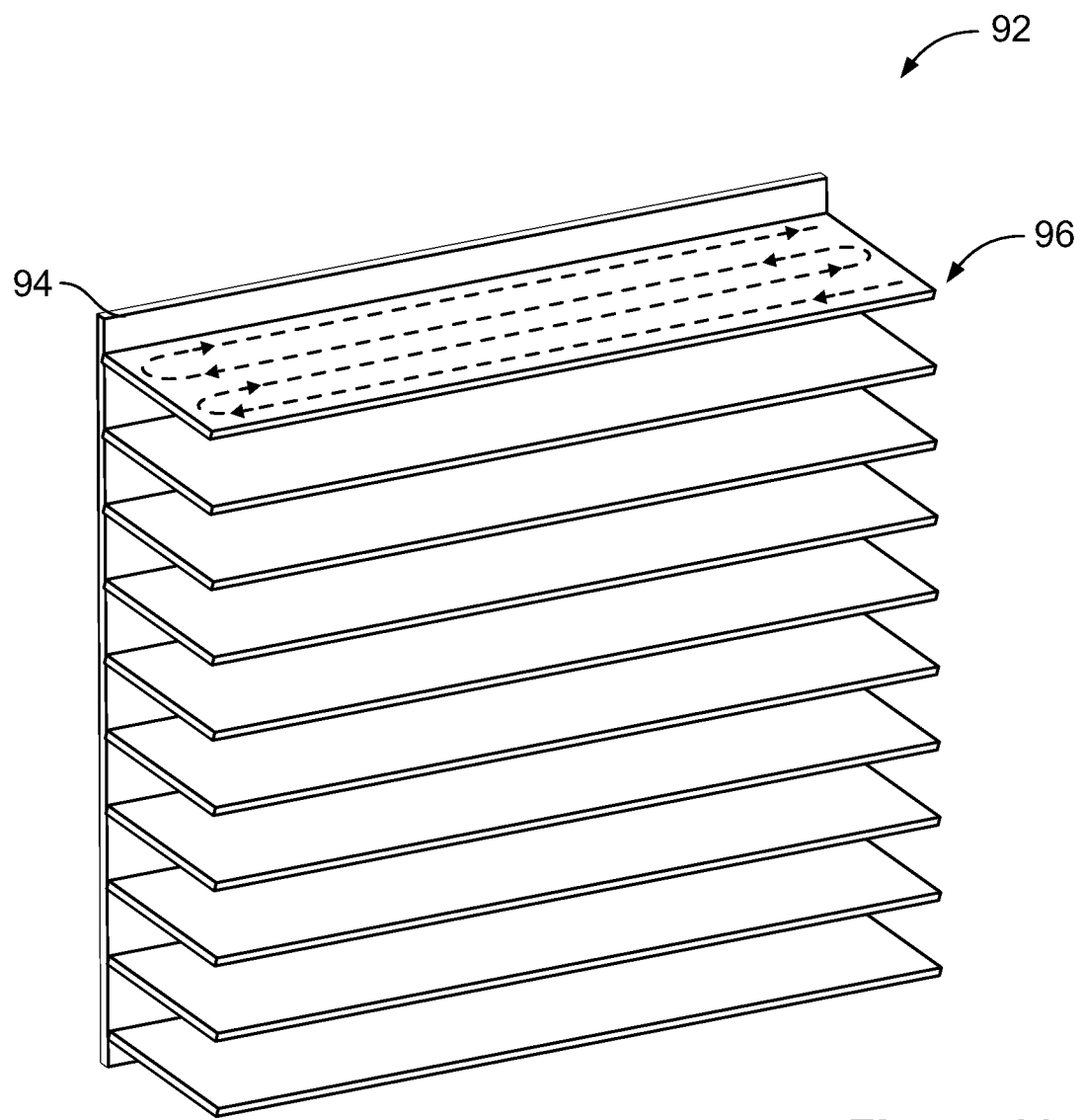
FIG. 16 is an illustration of another solar receiver according to another exemplary embodiment of the disclosure.
Figure 18:
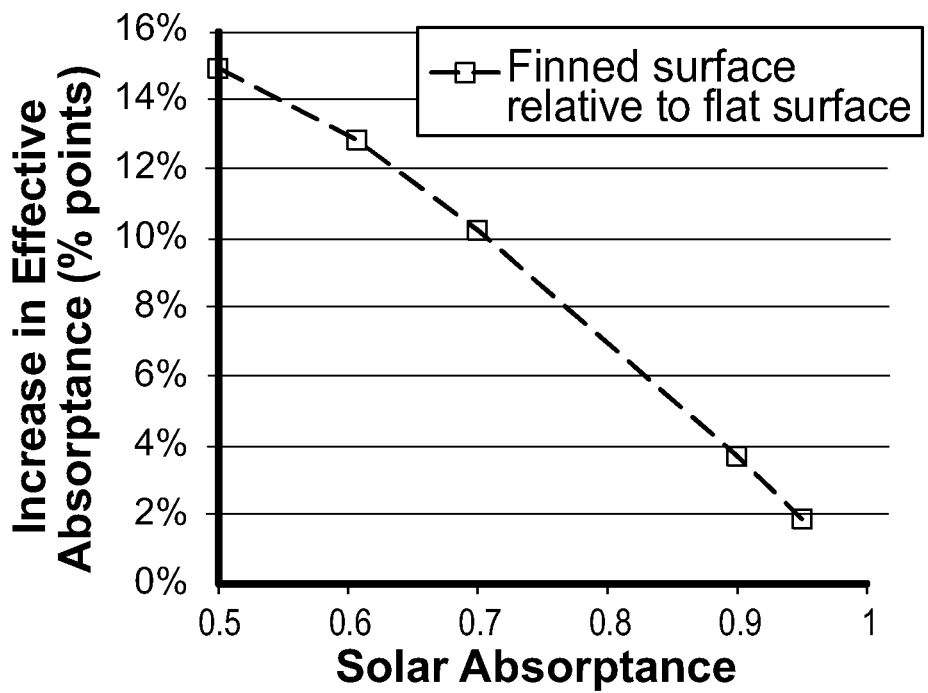
FIG. 18 shows increase in effective absorptance as a function of intrinsic material solar absorptance for flat and finned geometries.

FIG. 16 illustrates another example of a receiver 92 according to another embodiment of the disclosure. As can be seen in FIG. 18, the receiver 92 includes a support panel 94 and plurality of blades or panels 96. The support panel 94 serves a similar function as the hub 14 (FIG. 1) of a previous embodiment, and may include piping, pumps, and fluid and support structures. The plurality of receiver panels 96 extend from the plane of the receiver 92. In an embodiment, the support panel 94 may be attached to a tower as also shown in FIG. 1. The extending blade design increases the effective solar absorptance and efficiency by providing a light trap for the incident solar radiation while reducing heat losses from radiation and convection.

The panels 96, which have a general panel structure, are structured similar to the receiver panel 32 shown on FIG. 2, and includes the variations as discussed above with the various disclosed panel embodiments, including, but not limited to being constructed of a single panel or multiple panels. The panels 96 include the various embodiments of tubes and arrangements as disclosed above. In addition, the panels 96 include the various embodiments of flow patterns as disclosed above. In particular, the flow within the tubes within the panels may be from the panel leading edge to the trailing edge (as shown by the dashed line), so as to provide for the panels highest temperature nearest the support panel 94.

In this exemplary embodiment, the support panels 96 are aligned and attached horizontally to the support panel 94, or in other words, the flow in the tubes is horizontal in relation to any surface the receiver 92 is disposed above, and as similarly shown in FIG. 3. In another embodiment, the panels 96 may be aligned and attached vertically upon the support panel 94. In another embodiment, the receiver panels 96 may be attached at any angle to the support panel 92. In this exemplary embodiment, the receiver panels 96 are rigidly attached to the support panel 94. In another embodiment, the receiver panels 96 may be pivotally attached to the support panel 94.

Figure 17:
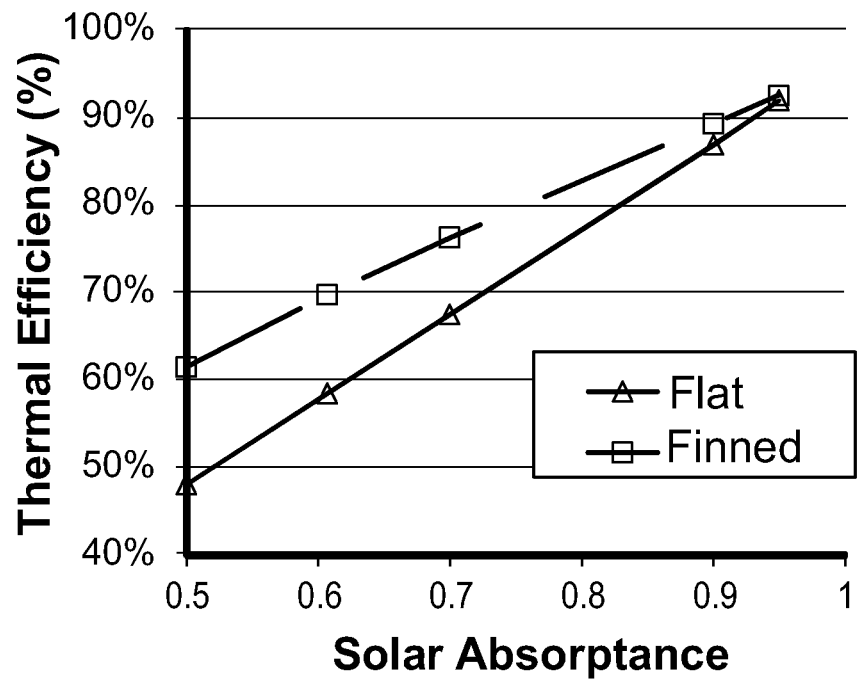
FIG. 17 shows simulated thermal efficiency as a function of intrinsic material solar absorptance for flat and finned geometries.

FIG. 17 shows simulated thermal efficiency as a function of intrinsic material solar absorptance for flat and finned geometries at the meso scale. As can be seen in FIG. 17, the thermal efficiency (energy absorbed divided by the incident energy) for the finned geometry is greater than thermal efficiency of the flat geometry. The finned geometry consisted of rectangular channels similar to that shown in FIG. 11. The increase in thermal efficiency is more pronounced when the intrinsic material solar absorptance is lower.

FIG. 18 shows increase in effective absorptance as a function of intrinsic material solar absorptance for flat and finned geometries at the meso scale. As can be seen in FIG. 18, the effective solar absorptance (or light trapping) for the finned surface is increased relative to a flat surface, and the increase is more pronounced at lower intrinsic material solar absorptance values.

The invention being thus described, it will be obvious that the same may be varied in many ways. Such variations are not to be regarded as a departure from the spirit and scope of the invention, and all such modifications as would be obvious to one skilled in the art are intended to be included within the scope of the appended claims. It is intended that the scope of the invention be defined by the claims appended hereto. The entire disclosures of all references, applications, patents and publications cited above are hereby incorporated by reference.

In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

We claim:

1. A solar receiver, comprising:
a plurality of receiver panel systems disposed radially about a vertical central hub having a vertical axis, wherein each of the plurality of receiver panel systems comprises a tailing edge proximate the vertical central hub and a leading edge distant from the vertical axis hub;
each of the plurality of receiver panel systems comprising a first solar panel and a second solar panel capable of absorbing solar energy, wherein the first solar panel and the second solar panel form a triangular shape that apexes in a radial direction away from the vertical central hub at the leading edge;
wherein the plurality of receiver panel systems capture and/or reflect impinging solar energy between adjacent receiver panel systems; and
wherein the first solar panel and second solar panel each comprise a plurality of tubes for transporting a fluid.

2. The solar receiver of claim 1, wherein the plurality of receiver panel systems extend radially from the vertical axis.

3. The solar receiver of claim 1, wherein at least one of the first and second solar panels comprise two or more solar sub-panels.

4. The solar receiver of claim 1, wherein the first and second solar panels are configured to contain a heat transfer fluid during operation, wherein the heat transfer fluid is introduced at a first temperature at the leading edge and is removed at a second temperature greater than the first temperature at the trailing edge during operation.

5. The solar receiver of claim 1, wherein each tube of the plurality of tubes comprises leading surfaces offset between 0 and 45 degrees from an adjacent tube.

6. The solar receiver of claim 1, wherein each tube of the plurality of tubes have a circular cross section that is offset by 30 degrees.

7. The solar receiver of claim 1, wherein each tube of the plurality of tubes have a diamond cross section that is offset by 0 degrees.

8. The solar receiver of claim 1, wherein each tube of plurality of tubes have a cross section selected from a group consisting of circular, rectangular, square and diamond.

* * * * *